(12) United States Patent
McKinzie et al.

(10) Patent No.: US 10,738,868 B2
(45) Date of Patent: Aug. 11, 2020

(54) MULTI-MODE POWERTRAINS

(71) Applicant: Deere & Company, Moline, IL (US)

(72) Inventors: Kyle K. McKinzie, Altamont, KS (US); Reginald M. Bindl, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/664,289

(22) Filed: Jul. 31, 2017

(65) Prior Publication Data
US 2017/0328453 A1    Nov. 16, 2017

Related U.S. Application Data

(63) Continuation-in-part of application No. 14/249,258, filed on Apr. 9, 2014, now Pat. No. 9,944,163.

(51) Int. Cl.
*F16H 37/08* (2006.01)
*B60K 6/445* (2007.10)
(Continued)

(52) U.S. Cl.
CPC .......... *F16H 37/084* (2013.01); *B60K 6/445* (2013.01); *B60K 6/547* (2013.01); *F16H 3/728* (2013.01);
(Continued)

(58) Field of Classification Search
CPC ....... F16H 2037/088; F16H 2037/0886; F16H 37/084
See application file for complete search history.

(56) References Cited

U.S. PATENT DOCUMENTS 3,214,987 A    11/1965   Schenck et al.
3,626,787 A    12/1971   Singer
(Continued)

FOREIGN PATENT DOCUMENTS

CN    101255907 A    9/2008
CN    102844588 A    12/2012
(Continued)

OTHER PUBLICATIONS

CNIPA Office Action dated Aug. 9, 2018 for Application No. 201510165982.4, Serial Notice No. 2018080601675890.
(Continued)

*Primary Examiner* — Erin D Bishop
(74) *Attorney, Agent, or Firm* — Klintworth & Rozenblat IP LLP

(57) ABSTRACT

A power train and related vehicle have a multi-mode power transmission with a first continuously variable power source ("CVP") that may convert rotational power received by the engine for transmission to a second CVP. A variator assembly may receive rotational power from the second CVP at a first input and directly from the engine at a second input. A control assembly may include one or more output components and a plurality of clutch devices arranged between the one or more output components and the variator assembly and engine. In a first state of the control assembly, the plurality of clutch devices may collectively provide direct power transmission between the engine and the one or more output components. In a second state of the control assembly, the plurality of clutches may collectively provide power transmission between the variator and the one or more output components.

13 Claims, 7 Drawing Sheets

(51) Int. Cl.
*B60K 6/547* (2007.10)
*F16H 3/72* (2006.01)
*B60K 6/12* (2006.01)

(52) U.S. Cl.
CPC ........... *B60K 6/12* (2013.01); *B60Y 2200/221* (2013.01); *F16H 2037/0886* (2013.01); *Y02T 10/6208* (2013.01); *Y02T 10/6239* (2013.01)

(56) References Cited

U.S. PATENT DOCUMENTS

| | | |
|---|---|---|
| 3,651,904 A | 3/1972 | Snoy et al. |
| 3,714,845 A | 2/1973 | Mooney, Jr. |
| 3,783,711 A | 1/1974 | Orshansky, Jr. |
| 4,090,414 A | 5/1978 | White |
| 4,164,155 A | 8/1979 | Reed et al. |
| 4,164,156 A | 8/1979 | Reed |
| 5,353,662 A | 10/1994 | Vaughters |
| 5,508,574 A | 4/1996 | Vlock |
| 5,931,757 A | 8/1999 | Schmidt |
| 6,478,705 B1 | 11/2002 | Holmes et al. |
| 6,684,148 B2 | 1/2004 | Chess |
| 7,008,342 B2 | 3/2006 | Dyck et al. |
| 7,252,611 B2 | 8/2007 | Raghavan et al. |
| 7,294,079 B2 | 11/2007 | Raghavan et al. |
| 7,311,627 B2 | 12/2007 | Tarasinski |
| 7,367,911 B2 * | 5/2008 | Raghavan ............... B60K 6/365 180/65.25 |
| 7,377,876 B2 | 5/2008 | Yang |
| 7,399,246 B2 | 7/2008 | Holmes et al. |
| 7,465,251 B2 | 12/2008 | Zhang |
| 7,473,201 B2 | 1/2009 | Raghavan et al. |
| 7,479,081 B2 | 1/2009 | Holmes |
| 7,491,144 B2 | 2/2009 | Conlon |
| 7,901,314 B2 | 3/2011 | Salvaire et al. |
| 7,942,776 B2 | 5/2011 | Conlon |
| 8,234,956 B2 | 8/2012 | Love et al. |
| 8,257,213 B2 | 9/2012 | Komada et al. |
| 8,469,127 B2 | 6/2013 | Tarasinski et al. |
| 8,500,585 B2 * | 8/2013 | Kim ................... F16H 3/728 475/282 |
| 8,573,340 B2 | 11/2013 | Tarasinski et al. |
| 8,579,751 B2 | 11/2013 | Phillips |
| 8,596,157 B2 | 12/2013 | Vu |
| 8,660,724 B2 | 2/2014 | Tarasinski et al. |
| 8,734,281 B2 | 5/2014 | Ai et al. |
| 8,747,266 B2 | 6/2014 | Aitzetmueller et al. |
| 8,784,246 B2 | 7/2014 | Treichel |
| 8,790,202 B2 | 7/2014 | Sakai et al. |
| 8,944,194 B2 | 2/2015 | Glaser et al. |
| 8,986,162 B2 | 3/2015 | Dix et al. |
| 9,002,560 B2 | 4/2015 | Hasegawa |
| 9,206,885 B2 * | 12/2015 | Rekow ..................... F16H 3/72 |
| 9,487,073 B2 | 11/2016 | Love et al. |
| 9,562,592 B2 | 2/2017 | Rekow et al. |
| 9,944,163 B2 | 4/2018 | McKinzie |
| 9,981,665 B2 * | 5/2018 | Rekow ............. B60W 30/1886 |
| 10,119,598 B2 * | 11/2018 | Rekow .................... F16H 3/728 |
| 2003/0186769 A1 | 10/2003 | Ai et al. |
| 2004/0094381 A1 | 5/2004 | Versteyhe |
| 2005/0049100 A1 | 3/2005 | Ai et al. |
| 2006/0046886 A1 | 3/2006 | Holmes et al. |
| 2006/0111212 A9 | 5/2006 | Ai et al. |
| 2006/0142104 A1 | 6/2006 | Saller |
| 2006/0276291 A1 | 12/2006 | Fabry et al. |
| 2007/0021256 A1 | 1/2007 | Klemen et al. |
| 2007/0021257 A1 | 1/2007 | Klemen et al. |
| 2007/0249455 A1 | 10/2007 | Hasegawa et al. |
| 2010/0048338 A1 | 2/2010 | Si |
| 2010/0179009 A1 | 7/2010 | Wittkopp et al. |
| 2010/0261565 A1 | 10/2010 | Ai et al. |
| 2011/0130235 A1 | 6/2011 | Phillips |
| 2012/0157254 A1 | 6/2012 | Aitzetmueller et al. |
| 2013/0023370 A1 | 1/2013 | Grad et al. |
| 2014/0018201 A1 * | 1/2014 | Tolksdorf ............... F16H 47/04 475/83 |
| 2014/0128196 A1 | 5/2014 | Rintoo |
| 2015/0006007 A1 | 1/2015 | Kitahata et al. |
| 2015/0072823 A1 | 3/2015 | Rintoo |
| 2015/0142232 A1 | 5/2015 | Tabata et al. |
| 2015/0183436 A1 | 7/2015 | Rekow et al. |
| 2015/0184726 A1 | 7/2015 | Rekow et al. |
| 2015/0292608 A1 | 10/2015 | McKinzie |
| 2016/0090091 A1 | 3/2016 | Gugel et al. |
| 2016/0201295 A1 | 7/2016 | Kishimoto et al. |
| 2016/0272059 A1 | 9/2016 | Watanabe et al. |
| 2017/0102059 A1 | 4/2017 | Rekow et al. |
| 2017/0284508 A1 | 10/2017 | Devreese |
| 2017/0284517 A1 * | 10/2017 | Rekow ................... F16H 61/66 |
| 2018/0043764 A1 | 2/2018 | McKinzie et al. |
| 2018/0149247 A1 * | 5/2018 | Rekow ................ F16H 37/086 |
| 2018/0298993 A1 | 10/2018 | Fliearman et al. |

FOREIGN PATENT DOCUMENTS

| | | |
|---|---|---|
| DE | 1173348 B | 7/1964 |
| DE | 4010919 A1 | 10/1991 |
| DE | 19621200 A1 | 11/1997 |
| DE | 19954636 A1 | 5/2001 |
| DE | 10128076 A1 | 12/2002 |
| DE | 102006041160 A1 | 9/2008 |
| DE | 112006002537 B4 | 9/2008 |
| DE | 202009007972 U1 | 6/2010 |
| DE | AT11545 U1 | 12/2010 |
| DE | 102010021846 A1 | 12/2011 |
| DE | 102011102184 A1 | 7/2012 |
| DE | 102011102210 A1 | 7/2012 |
| DE | 102011105868 A1 | 1/2013 |
| DE | 102011115002 A1 | 4/2013 |
| DE | 102013220167 A1 | 4/2015 |
| DE | 202015102282 U1 | 5/2015 |
| DE | 19214225298 A1 | 7/2015 |
| DE | 102015200973 A1 | 7/2016 |
| DE | 102016120965 A1 | 5/2017 |
| DE | 102016204727 A1 | 9/2017 |
| DE | 102018108510 A1 | 10/2018 |
| EP | 0805059 A2 | 5/1997 |
| EP | 1099882 A2 | 5/2001 |
| EP | 1707416 B1 | 8/2007 |
| EP | 02466168 A1 | 6/2012 |
| EP | 02466169 A1 | 6/2012 |
| WO | 2011092643 A1 | 8/2011 |
| WO | 2012171812 A1 | 12/2012 |

OTHER PUBLICATIONS

Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.

Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.

John M. Miller, Hybrid Electric Vehicle Propulsion System Architectures of the e-CVT Type, IEEE Transactions on Power Electronics, vol. 21, No. 3, May 2006.

Deere & Company, U.S. Appl. No. 15/879,796, filed Jan. 25, 2018.
Deere & Company, U.S. Appl. No. 15/971,867, filed May 4, 2018.
Deere & Company, U.S. Appl. No. 15/977,242, filed May 11, 2018.
Deere & Company, U.S. Appl. No. 16/371,598, filed Apr. 1, 2019.
USPTO, Office Action in U.S. Appl. No. 14/536,097 dated Sep. 25, 2017.
USPTO, Office Action in U.S. Appl. No. 14/249,258 dated Apr. 21, 2017.
USPTO, Office Action in U.S. Appl. No. 14/249,258 dated Aug. 22, 2017.
USPTO, Office Action in U.S. Appl. No. 14/249,258 dated Oct. 17, 2016.

(56) References Cited

OTHER PUBLICATIONS

USPTO, Office Action in U.S. Appl. No. 15/485,911 dated Feb. 8, 2019.
USPTO, Office Action in U.S. Appl. No. 15/879,796 dated Aug. 23, 2019.
USPTO, Office Action in U.S. Appl. No. 15/793,522 dated Apr. 18, 2019.
USPTO, Non-Final Office Action issued in pending U.S. Appl. No. 15/628,979 dated Nov. 5, 2019.
USPTO, Non-Final Office Action issued in pending U.S. Appl. No. 15/971,867 dated Dec. 12, 2019.
German Search Report for application No. 102019204706.8 dated Dec. 17, 2019.

* cited by examiner

MULTI-MODE POWERTRAINS

CROSS-REFERENCE TO RELATED APPLICATION(S)

This application is a continuation-in-part application of U.S. patent application Ser. No. 14/249,258, filed Apr. 9, 2014, which published as U.S. Patent Publication No. 2015/0292608 on Oct. 15, 2015. The entire disclosure of the above application is incorporated herein by reference.

STATEMENT OF FEDERALLY SPONSORED RESEARCH OR DEVELOPMENT

Not applicable.

FIELD OF THE DISCLOSURE

This disclosure relates to power trains, including power trains for the operation of work vehicles for agricultural, forestry, construction, and other applications.

BACKGROUND OF THE DISCLOSURE

It may be useful, in a variety of settings, to utilize both a traditional engine (e.g., an internal combustion engine) and one or more continuously variable power sources (e.g., an electric motor/generator or hydraulic motor/pump, and so on) to provide useful power. For example, a portion of engine power may be diverted to drive a first continuously variable power source ("CVP") (e.g., a first electric motor/generator acting as a generator, a first hydrostatic or hydrodynamic motor/pump acting as a pump, and so on), which may in turn drive a second CVP (e.g., a second electric motor/generator acting as a motor using electrical power from the first electric motor/generator, a second hydrostatic or hydrodynamic motor/pump acting as a motor using the hydraulic power from the first hydrostatic or hydrodynamic motor/pump, and so on).

In certain applications, power from both types of power sources (i.e., an engine and a CVP) may be combined for delivery of useful power (e.g., to drive a vehicle axle) via an infinitely variable transmission ("IVT") or continuously variable transmission ("CVT"). This may be referred to as "split-mode" or "split-path mode" because power transmission may be split between a direct mechanical path from the engine and an infinitely/continuously variable path through one or more CVPs. In other applications, in contrast, useful power may be provided by a CVP but not by the engine (except to the extent the engine drives the CVP). This may be referred to as "CVP-only mode." Finally, in still other applications, useful power may be provided by the engine (e.g., via various mechanical transmission elements, such as shafts and gears), but not by a CVP. This may be referred to as "mechanical-path mode." It will be understood that torque converters and various similar devices may sometimes be used in the mechanical-path mode. In this light, a mechanical-path mode may be viewed simply as a power transmission mode in which the engine, but not the CVPs, provides useful power to a particular power sink.

SUMMARY OF THE DISCLOSURE

A power train and a vehicle for providing multiple transmission modes are disclosed. According to one aspect of the disclosure, a power train for a vehicle with an engine includes a variator assembly and a control assembly with an output component and a plurality of clutch devices arranged between the output component and at least one of the variator assembly and the engine. A first continuously variable power source ("CVP") may convert rotational power received by the engine for transmission to a second CVP. The variator assembly may receive power from the second CVP at a first input and may receive rotational power directly from the engine at a second input, in order to sum the power of the respective inputs. In a first state of the control assembly, the plurality of clutch devices may collectively provide direct power transmission between the engine and the output component. In a second state of the control assembly, the plurality of clutch devices may collectively provide power transmission between the variator and the one or more output components.

In certain embodiments, a first clutch device of the control assembly may receive power directly from the engine and a second clutch device of the control assembly may receive power, via the variator assembly, from the engine and the second CVP. In the first state of the control assembly, the first clutch device may be engaged and the second clutch device may be disengaged. In the second state of the control assembly, the first clutch device may be disengaged and the second clutch device may be engaged.

In certain embodiments, a third clutch device of the control assembly may receive power directly from the second CVP. In a third state of the control assembly, the first and second clutch devices may be disengaged and the third clutch device may be engaged, in order to transmit power directly from the second CVP to the output component of the control assembly.

In certain embodiments, two or more of the first, second and third clutch devices may be mounted to a single shaft or to multiple coaxial shafts. In certain embodiments, various coaxial, parallel or other shafts may be utilized. The variator assembly may include a planetary gear set including a sun gear, a ring gear and a planet carrier. The second CVP may provide power to the sun gear and the engine may provide power to the planet carrier.

In another aspect, a work vehicle is disclosed that includes an engine, at least one continuously variable power source (CVP), a variator, and an output component. The work vehicle further includes a control assembly with a plurality of transmission components configured to provide selection between a first mode, a second mode, and a third mode. The control assembly, in the first mode, is configured to transfer engine power from the engine to the output component and prevent transmission of CVP power from the at least one CVP to the output component. The control assembly, in the second mode, is configured to transfer engine power from the engine to the variator, transfer CVP power from the at least one CVP to the variator, and transfer a combination of engine power and CVP power from the variator to the output component. The control assembly, in the third mode, is configured to transfer CVP power from the at least one CVP to the output component and prevent transmission of engine power from the engine to the output component. The plurality of transmission components of the control assembly include a brake having a braked position and an unbraked position. The brake is configured to change between the braked position and the unbraked position to provide at least one of the first mode, the second mode, and the third mode.

In a further aspect, a method of operating a power train of a work vehicle is disclosed. The method includes providing, in a first transmission mode, engine power from an engine to an output component of the vehicle while preventing transmission of CVP power from at least one CVP to the output component. The method also includes providing, in a second transmission mode, engine power from the engine to a variator while providing CVP power from the at least one CVP to the variator and transferring a combination of engine power and CVP power from the variator to the output component. Moreover, the method includes providing, in a third transmission mode, CVP power from the at least one CVP to the output component while preventing transmission of engine power from the engine to the output component. Also, the method includes moving a brake from an unbraked position to a braked position to provide at least one of the first transmission mode, the second transmission mode, and the third transmission mode.

In still another aspect, a work vehicle is disclosed that includes an engine, a first variable power source (CVP), and a second CVP. The work vehicle also includes a variator that comprises a planetary gear set with a sun gear, a plurality of planet gears with an associated carrier, and a ring gear. The work vehicle further includes an output component and a control assembly with at least one clutch and at least one brake. The control assembly is configured to provide selection between a first mode, a second mode, and a third mode. The control assembly, in the first mode, is configured to transfer engine power from the engine to the output component and prevent transmission of CVP power from the at least one CVP to the output component. The control assembly, in the second mode, is configured to transfer engine power from the engine to the variator, transfer CVP power from the at least one CVP to the variator, and transfer a combination of engine power and CVP power from the variator to the output component. The control assembly, in the third mode, is configured to transfer CVP power from the at least one CVP to the output component and prevent transmission of engine power from the engine to the output component. The brake has a braked position and an unbraked position, and the brake is configured to change between the braked position and the unbraked position to provide at least one of the first mode, the second mode, and the third mode.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
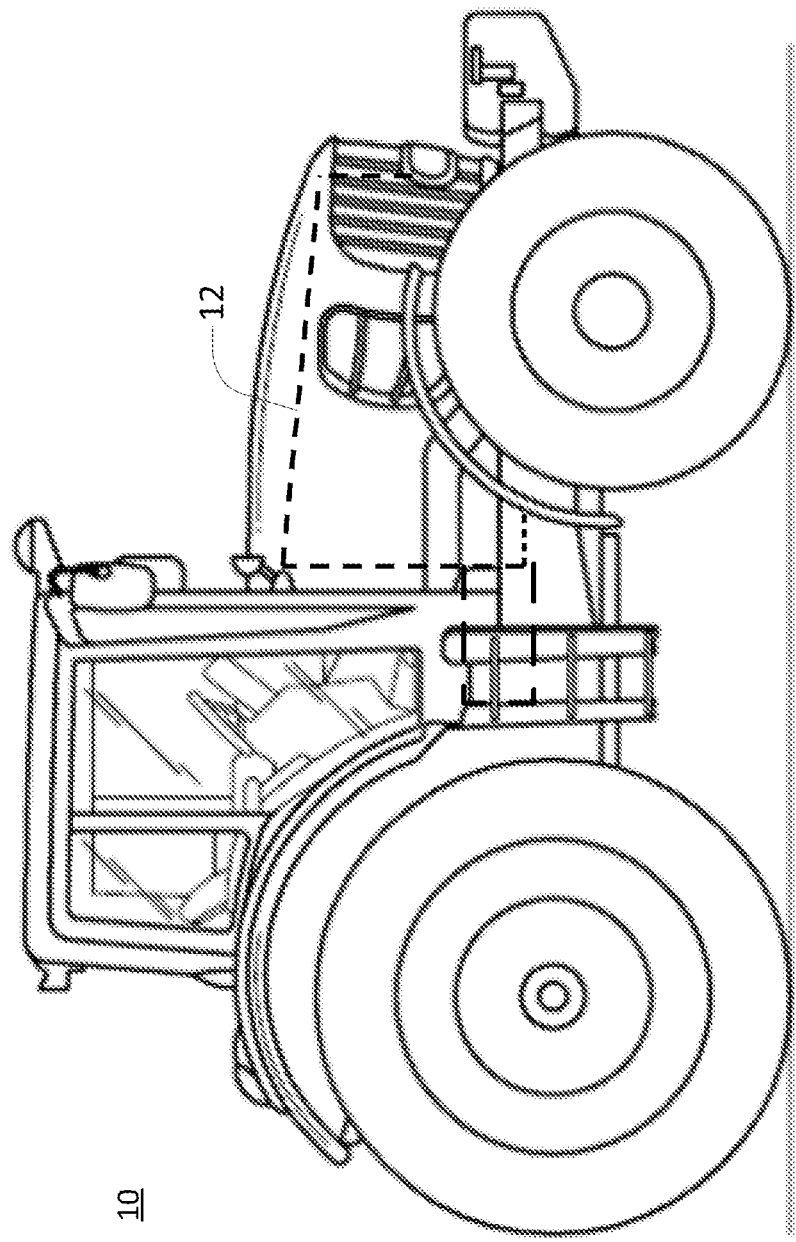
FIG. 1 is a side view of an example vehicle that may include a multi-mode transmission according to the present disclosure.

The following describes one or more example embodiments of the disclosed power train (or vehicle), as shown in the accompanying figures of the drawings described briefly above. Various modifications to the example embodiments may be contemplated by one of skill in the art.

For convenience of notation, "component" may be used herein, particularly in the context of a planetary gear set, to indicate an element for transmission of power, such as a sun gear, a ring gear, or a planet gear carrier. Further, references to a "continuously" variable transmission, power train, or power source will be understood to also encompass, in various embodiments, configurations including an "infinitely" variable transmission, power train, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In certain configurations, fluidic transfer of rotational power by a torque converter may also be considered "direct."

In contrast, power may not be considered as "directly" transmitted between two system elements if some portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly).

Also as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

In the use of continuously (or infinitely) variable power trains, the relative efficiency of power transmission in various modes may be of some concern. It will be understood, for example, that energy losses may inhere in each step of using a first CVP to convert rotational power from the engine into electrical or hydraulic power, transmitting the converted power to a second CVP, and then converting the transmitted power back to rotational power. In this light, mechanical transmission of power directly from an engine (i.e., in a mechanical-path transmission mode) may be viewed a highly efficient mode of power transmission, whereas transmission of power through a CVP (e.g., in a split-path transmission mode or a CVP-only transmission mode) may be less efficient. Accordingly, in certain circumstances it may be desirable to utilize mechanical-path transmission mode rather than a split-path mode or CVP-only mode. However, in other circumstances, the flexibility and other advantages provided by use of CVPs may outweigh the inherent energy losses of a split-path or CVP-only mode.

Among other advantages, the power trains disclosed herein may usefully facilitate transition between split-path, mechanical-path, and CVP-only modes for a vehicle or other powered platform. For example, through appropriate arrangement and control of various gear sets, shafts and clutches, the disclosed power train may allow a vehicle to be easily transitioned between any of the three modes, depending on the needs of a particular operation.

In certain embodiments of the contemplated power train, an engine may provide power via various mechanical (or other) power transmission elements (e.g., various shafts and gears, and so on) to both a first input component of a variator (e.g., a planet carrier of a summing planetary gear set) and an input interface (e.g., a splined connection for a rotating shaft) of a first CVP. The first CVP (e.g., an electrical or hydraulic machine) may convert the power to a different form (e.g., electrical or hydraulic power) for transmission to a second CVP (e.g., another electrical or hydraulic machine), in order to allow the second CVP to provide rotational power to a second input of the variator (e.g., a sun gear of the summing planetary gear set).

A control assembly may be provided having at least a first and a second clutch device in communication with one or more output components (e.g., an input shaft to a power-shift transmission). The clutch devices may be generally oriented between the output components (and various power sinks of the vehicle, such as the vehicle wheels, differential, power take-off shaft, and so on) and one or more of the engine and the CVPs. In certain embodiments, the first and second clutch devices may be mounted to a single shaft (or set of coaxial shafts), which may rotate in parallel with the various inputs to the variator (e.g., the various inputs to a planetary gear set), the output shafts of the engine and CVPs, and so on. In certain embodiments, the first and second clutches may be mounted to different shafts, each of which may rotate in parallel with the inputs to the variator.

The first clutch device of the control assembly may receive rotational power directly from the engine. For example, the first clutch device may engage a gear that is in communication an output shaft of the engine (e.g., the same output shaft that drives the first input component of the variator) through one or more geared connections. As such, the first clutch device may provide a controllable power transmission path for direct power transmission from the engine to the output of the control assembly.

The second clutch device of the control assembly may receive rotational power from an output component of the variator (e.g., a ring gear of the planetary gear set). For example, the second clutch device may engage a gear that is in communication with the output component of the variator through one or more geared connections. As such, the second clutch device may provide a controllable power transmission path for power transmission from both the engine and the second CVP, via the variator, to the output of the control assembly.

With the configuration generally described above (and others), engaging the first clutch device and disengaging the second clutch device may place the power train into a mechanical-path mode, causing power to flow directly from the engine through the first clutch device and the control assembly to an output of the control assembly. In certain embodiments, such output may be, or may engage with, an input of an additional power train component (e.g., the input of a power-shift or other transmission). Similarly, engaging the second clutch device and disengaging the first clutch device may place the power train into a split-path mode, with power from the engine and the second CVP (as powered by the engine via the first CVP) being summed by the variator before flowing through the second clutch device and the control assembly to the control assembly output.

In certain embodiments, a third clutch device may also be included in the control assembly between the output components of the control assembly and one or more of the engine and the CVPs. In certain embodiments, the third clutch device may be mounted to the same shaft (or set of coaxial shafts) as the first and second clutch devices. In certain embodiments, the third clutch device may be mounted to different shafts from one or both of the first and second clutch devices (e.g., a different, parallel shaft).

The third clutch device may receive rotational power directly from the second CVP. For example, the third clutch device may engage a gear in communication with an output shaft of the second CVP (e.g., the same output shaft that drives the second input component of the variator) through one or more geared connections. As such, engaging the third clutch device and disengaging the first and second clutch devices may place the power train into a CVP-only mode, with power flowing directly from the second CVP through the third clutch device and the control assembly to an output (e.g., the input of a power-shift or other transmission). In such a configuration, the third clutch device may then be disengaged for the mechanical-path and split-path modes described above.

As will become apparent from the discussion herein, the disclosed power train may be used advantageously in a variety of settings and with a variety of machinery. For example, referring now to FIG. 1, an example of the disclosed power trains may be included in a vehicle 10. In FIG. 1, the vehicle 10 is depicted as a tractor with a power train 12. It will be understood, however, that other configurations may be possible, including configurations with vehicle 10 as a different kind of tractor, a harvester, a log skidder, a grader, or one of various other work vehicle types. It will further be understood that the disclosed power trains may also be used in non-work vehicles and non-vehicle applications (e.g., fixed-location power installations).

Figure 2:
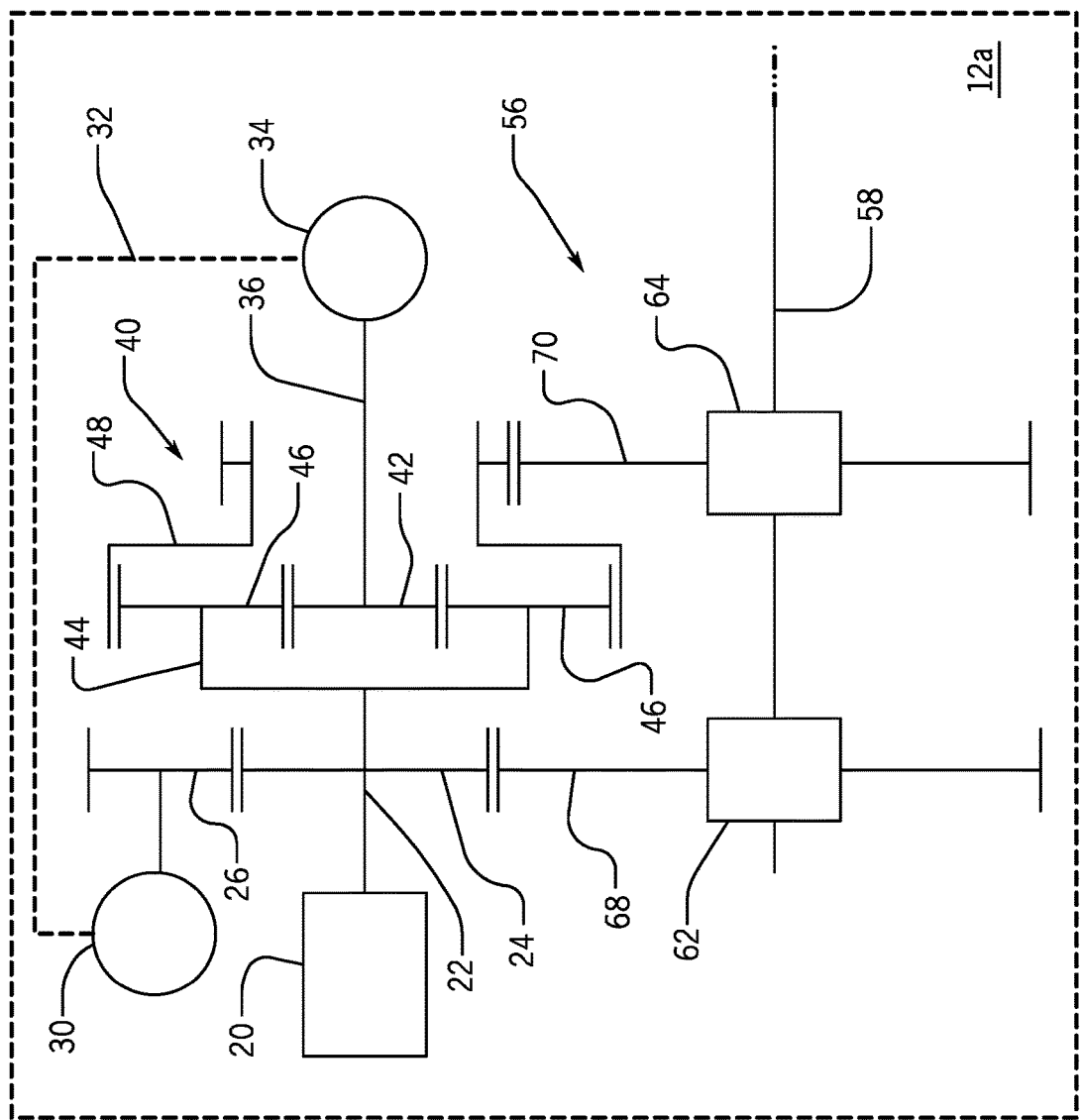
FIG. 2 is a schematic view of an example power train of the example vehicle of FIG. 1.

Referring also to FIG. 2, an example configuration of the power train 12 is depicted as a power train 12a. The power train 12a may include an engine 20, which may be an internal combustion engine of various known configurations. The power train 12a may also include a CVP 30 (e.g., an electrical generator or hydraulic pump) and a CVP 34 (e.g., an electrical or hydraulic motor, respectively), which may be connected by a conduit 32 (e.g., an electrical or hydraulic conduit, respectively).

The engine 20 may provide rotational power to an output shaft 22, for transmission to various power sinks (e.g., wheels, power take-off ("PTO") shafts, and so on) of the vehicle 10. In certain embodiments, a torque converter or other device may be included between the engine 20 and the shaft 22 (or another shaft (not shown)), although such a device is not necessary for the operation of the power train 12a, as contemplated by this disclosure. Further, in certain embodiments, multiple shafts (not shown), including various shafts interconnected by various gears or other power transmission devices, or equivalent power transmission devices (e.g., chains, belts, and so on) may be used in place of the shaft 22 (or various other shafts discussed herein).

The engine 20 may also provide rotational power to the CVP 30. For example, the engine output shaft 22 may be configured to provide rotational power to a gear 24, or another power transmission component (not shown), for transmission of power from the engine 20 to a gear 26 on a parallel shaft. In turn, the gear 26 (via the parallel shaft) may provide rotational power to the CVP 30.

Continuing, the CVP 30 may convert the received power to an alternate form (e.g., electrical or hydraulic power) for transmission over the conduit 32. This converted and transmitted power may be received by the CVP 34 and then re-converted by the CVP 34 to provide a rotational power output (e.g., along an output shaft 36). Various known control devices (not shown) may be provided to regulate such conversion, transmission, re-conversion and so on.

Both the engine 20 and the CVP 34 may provide rotational power to a variator 40 via, respectively, the shafts 22 and 36 (or various similar components). Generally, the variator 40 may include a variety of devices capable of summing the mechanical inputs from the shafts 22 and 36 for a combined mechanical output, as may be useful, for example, for split-path power transmission. In certain embodiments, as depicted in FIG. 2, the variator 40 may be configured as a summing planetary gear set. As depicted, the shaft 22 may provide power to a planet carrier 44, the shaft 36 may provide power to a sun gear 42, and planet gears 46 may transmit power from both the planet carrier 44 and the sun gear 42 to a ring gear 48. This may be a useful configuration because the CVP 34 may more efficiently operate at higher rotational speeds than the engine 20, which may be complimented by the speed reduction from the sun gear 42 to the planet carrier 44. It will be understood, however, that other configurations may be possible, with the engine 20 providing rotational power to any of the sun gear 42, the planet carrier 44, and the ring gear 48, the CVP 34 providing rotational power, respectively, to any other of the sun gear 42, the planet carrier 44, and the ring gear 48, and the remaining one of the sun gear 42, the planet carrier 44, and the ring gear 48.

To control transition between various transmission modes, a control assembly 56 may be configured to receive power one or more of directly from the engine 20, from the engine 20 and the CVP 34 via the variator 40, and directly from the CVP 34, and to transmit the received power to various downstream components. In the power train 12a, for example, the control assembly 56 may include a single output shaft (or set of coaxial output shafts) 58 or various other output components, which may be in communication with various power sinks or other downstream components (not shown) of the vehicle 10, such as various vehicle wheels, one or more differentials, a power-shift or other transmission, and so on. The shaft(s) 58 may also be in communication with (e.g., may be engaged with) clutch devices 62 and 64, which may be variously configured as wet clutches, dry clutches, dog collar clutches, or other similar devices mounted to the shaft(s) 58.

The clutch device 62 may be in communication with a gear 68, which may be meshed (directly or indirectly) with the gear 24 on the engine output shaft 22. Accordingly, when the clutch device 62 is engaged, a power-transmission path may be provided from the engine 20 to the shaft(s) 58, via the gears 24 and 68 and the clutch device 62. (As depicted, the gear 24 may transmit power from the shaft 22 to both the CVP 30 and the gear 68. It will be understood, however, that separate gears (not shown) may separately transmit power, respectively, from the engine 20 to the gears 26 and 68.)

Similarly, the clutch device 64 may be in communication with a gear 70, which may be meshed (directly or indirectly) with the ring gear 48 (or another output component) of the variator 40. Accordingly, when the clutch device 64 is engaged, a power-transmission path may be provided from the variator 40 to the shaft(s) 58, via the gear 70 and the clutch device 64.

In this way, for example, engaging the clutch device 62 and disengaging the clutch device 64 may place the power train 12a in a mechanical-path mode, in which rotational power is directly transmitted from the engine 20, via the clutch device 62, to the shaft(s) 58. Further, engaging the clutch device 64 and disengaging the clutch device 62 may place the power train 12a in a split-path mode, in which power from both the engine 20 and the CVP 34 is combined in the variator 40 before being transmitted, via the clutch device 64, to the shaft(s) 58.

Figure 3:
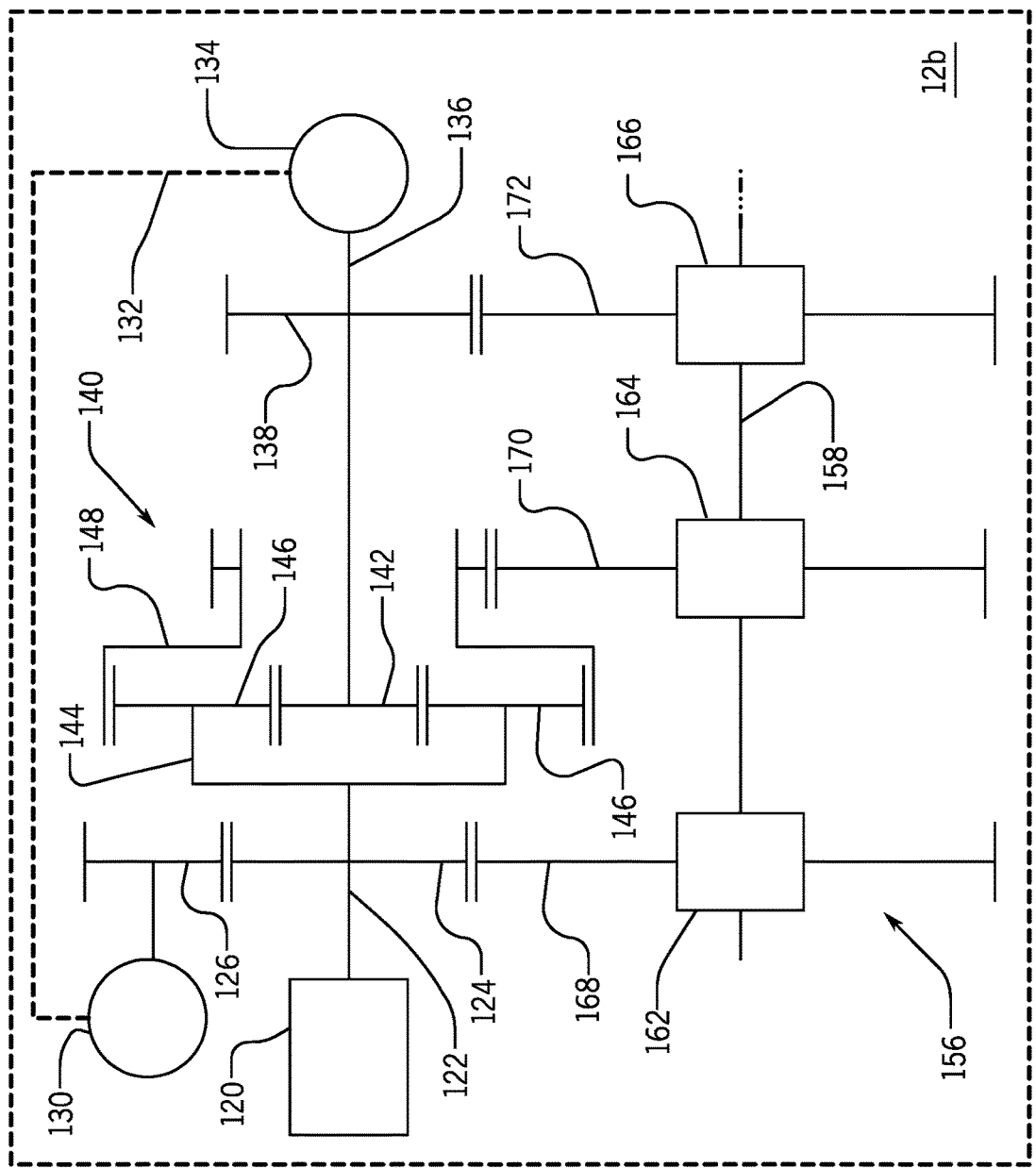
FIG. 3 is a schematic view of another example power train of the example vehicle of FIG. 1.

Referring also to FIG. 3, another example power train 12b is depicted. The power train 12b may include an engine 120, which may be an internal combustion engine of various known configurations. The power train 12b may also include a CVP 130 (e.g., an electrical generator or hydraulic pump) and a CVP 134 (e.g., an electrical or hydraulic motor, respectively), which may be connected by a conduit 132 (e.g., an electrical or hydraulic conduit, respectively).

The engine 120 may provide rotational power to an output shaft 122, for transmission to various power sinks (e.g., wheels, PTO shafts, and so on) of the vehicle 10. In certain embodiments, a torque converter or other device may be included between the engine 120 and the shaft 122 (or another shaft (not shown)), although such a device is not necessary for the operation of the power train 12b, as contemplated by this disclosure. Further, in certain embodiments, multiple shafts (not shown), including various shafts interconnected by various gears or other power transmission devices, or equivalent power transmission devices (e.g., chains, belts, and so on) may be used in place of the shaft 122 (or various other shafts discussed herein).

The shaft 122 may be configured to provide rotational power to a gear 124, or another power transmission component (not shown), for transmission of power from the engine 120 to a gear 126. In turn, the gear 126 may provide rotational power to the CVP 130, for conversion to an alternate form (e.g., electrical or hydraulic power) for transmission over the conduit 132. This converted and transmitted power may then be re-converted by the CVP 134 for mechanical output along an output shaft 136. Various known control devices (not shown) may be provided to regulate such conversion, transmission, re-conversion and so on. In certain embodiments, the shaft 136 may be in communication with a spur gear 138 (or other similar component).

Both the engine 120 and the CVP 134 may provide rotational power to a variator 140 via, respectively, the shafts 122 and 136. Generally, the variator 140 may include a variety of devices capable of summing the mechanical inputs from the shafts 122 and 136 for a combined mechanical output, as may be useful, for example, for split-path power transmission. In certain embodiments, as depicted in FIG. 3, the variator 140 may be configured as a summing planetary gear set. As depicted, the shaft 122 may provide power to a planet carrier 144, the shaft 136 may provide power to a sun gear 142, and planet gears 146 may transmit power from both the planet carrier 144 and the sun gear 142 to a ring gear 148. This may be a useful configuration because the CVP 134 may more efficiently operate at higher rotational speeds than the engine 120, which may be complimented by the speed reduction from the sun gear 142 to the planet carrier 144. It will be understood, however, that other configurations may be possible, with the engine 120 providing rotational power to any of the sun gear 142, the planet carrier 144, and the ring gear 148, the CVP 134 providing rotational power, respectively, to any other of the sun gear 142, the planet carrier 144, and the ring gear 148, and the remaining one of the sun gear 142, the planet carrier 144, and the ring gear 148.

To control transition between various transmission modes, a control assembly 156 may be configured to receive power one or more of directly from the engine 120, from the engine 120 and the CVP 134 via the variator 140, and directly from the CVP 134, and to transmit the received power to various downstream components. In the power train 12b, for example, the control assembly 156 may include a single shaft (or set of coaxial shafts) 158, which may be in communication with various power sinks or other downstream components (not shown) of the vehicle 10, such as various vehicle wheels, one or more differentials, a power-shift or other transmission, and so on. The shaft(s) 158 may also be in communication with (e.g., may be engaged with) clutch devices 162, 164 and 166, which may be variously configured as wet clutches, dry clutches, dog collar clutches, or other similar devices mounted to the shaft(s) 158.

The clutch device 162 may be in communication with a gear 168, which may be meshed (directly or indirectly) with the gear 124 on the engine output shaft 122. Accordingly, when the clutch device 162 is engaged, a power-transmission path may be provided from the engine 120 to the shaft(s) 158, via the gears 124 and 168 and the clutch device 162. (As depicted, the gear 124 may transmit power from the shaft 122 to both the CVP 130 and the gear 168. It will be understood, however, that separate gears (not shown) may separately transmit power, respectively, from the engine 120 to the gears 126 and 168.)

Similarly, the clutch device 164 may be in communication with a gear 170, which may be meshed (directly or indirectly) with the ring gear 148 (or another output component) of the variator 140. Accordingly, when the clutch device 164 is engaged, a power-transmission path may be provided from the variator 140 to the shaft(s) 158, via the gear 170 and the clutch device 164. Finally, the clutch device 166 may be in communication with a gear 170, which may be meshed (directly or indirectly) with the gear 138 on the output shaft 136 of the CVP 134. Accordingly, when the clutch device 166 is engaged, a power-transmission path may be provided from the CVP 134 to the shaft(s) 158, via the gears 138 and 172 and the clutch device 166.

In this way, for example, engaging the clutch device 162 and disengaging the clutches 164 and 166 may place the power train 12b in a mechanical-path mode, in which rotational power is directly transmitted from the engine 120, via the clutch device 162, to the shaft(s) 158. Further, engaging the clutch device 164 and disengaging the clutches 162 and 166 may place the power train 12b in a split-path mode, in which power from both the engine 120 and the CVP 134 is combined in the variator 140 before being transmitted, via the clutch device 164, to the shaft(s) 158. Finally, engaging the clutch device 166 and disengaging the clutches 162 and 164 may place the power train 12b in a CVP-only mode, in which rotational power is directly transmitted from the CVP 134, via the clutch device 166, to the shaft(s) 158.

Figure 4:
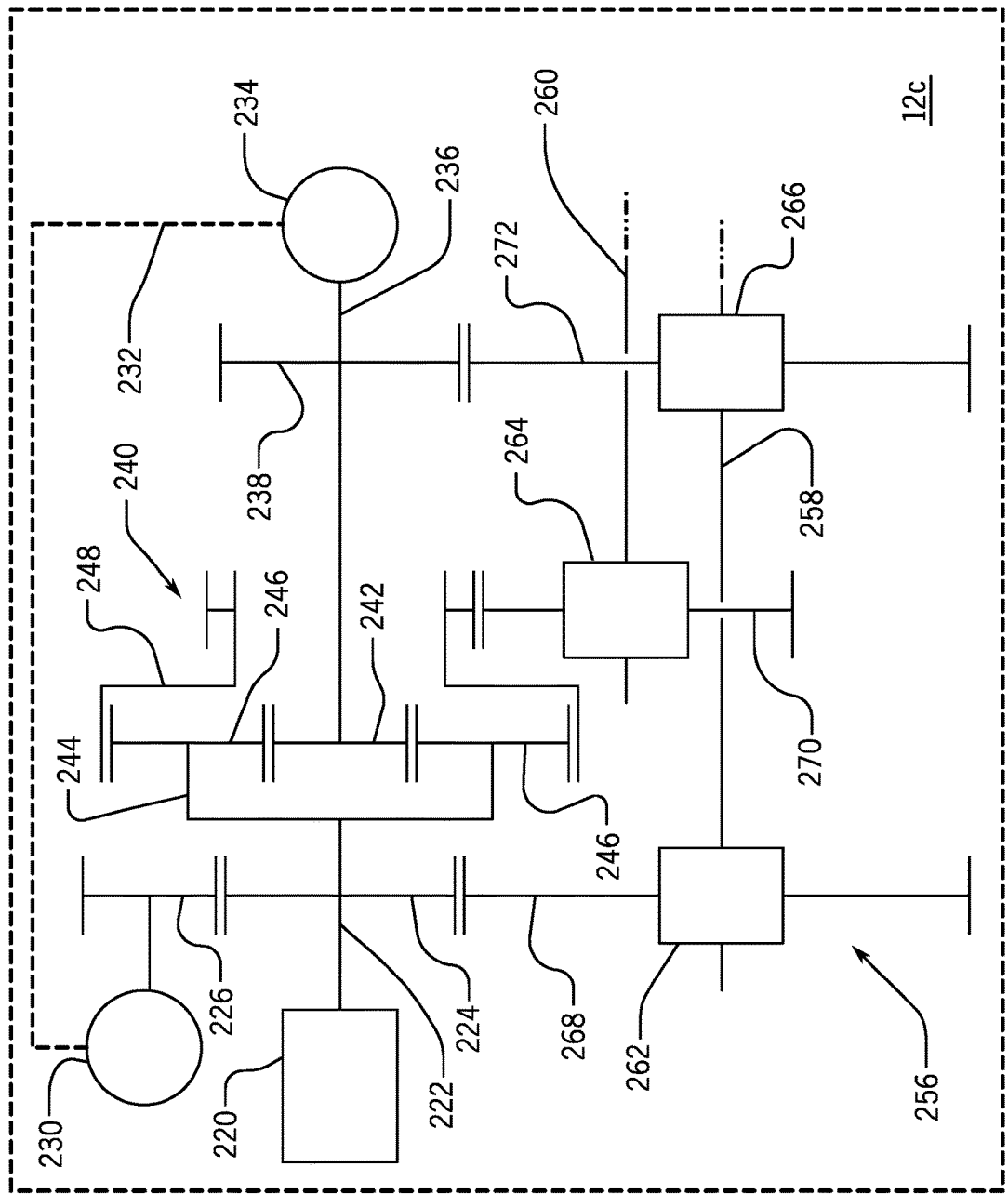
FIG. 4 is a schematic view of yet another example power train of the example vehicle of FIG. 1.

Referring also to FIG. 4, another example power train 12c is depicted. The power train 12c may include an engine 220, which may be an internal combustion engine of various known configurations. The power train 12c may also include a CVP 230 (e.g., an electrical generator or hydraulic pump) and a CVP 234 (e.g., an electrical or hydraulic motor, respectively), which may be connected by a conduit 232 (e.g., an electrical or hydraulic conduit, respectively).

The engine 220 may provide rotational power to an output shaft 222, for transmission to various power sinks (e.g., wheels, PTO shafts, and so on) of the vehicle 10. In certain embodiments, a torque converter or other device may be included between the engine 220 and the shaft 222 (or another shaft (not shown)), although such a device is not necessary for the operation of the power train 12c, as contemplated by this disclosure. Further, in certain embodiments, multiple shafts (not shown), including various shafts interconnected by various gears or other power transmission devices, or equivalent power transmission devices (e.g., chains, belts, and so on) may be used in place of the shaft 222 (or various other shafts discussed herein).

The shaft 222 may be configured to provide rotational power to a gear 224, or another power transmission component (not shown), for transmission of power from the engine 220 to a gear 226. In turn, the gear 226 may provide rotational power to the CVP 230, for conversion to an alternate form (e.g., electrical or hydraulic power) for transmission over the conduit 232. This converted and transmitted power may then be re-converted by the CVP 234 for mechanical output along an output shaft 236. Various known control devices (not shown) may be provided to regulate such conversion, transmission, re-conversion and so on. In certain embodiments, the shaft 236 may be in communication with a spur gear 138 (or other similar component).

Both the engine 220 and the CVP 234 may provide rotational power to a variator 240 via, respectively, the shafts 222 and 236. Generally, the variator 240 may include a variety of devices capable of summing the mechanical inputs from the shafts 222 and 236 for a combined mechanical output, as may be useful, for example, for split-path power transmission. In certain embodiments, as depicted in FIG. 4, the variator 240 may be configured as a summing planetary gear set. As depicted, the shaft 222 may provide power to a planet carrier 244, the shaft 236 may provide power a to sun gear 242, and planet gears 246 may transmit power from both the planet carrier 244 and the sun gear 242 to a ring gear 248. This may be a useful configuration because the CVP 234 may more efficiently operate at higher rotational speeds than the engine 220, which may be complimented by the speed reduction from the sun gear 242 to the planet carrier 244. It will be understood, however, that other configurations may be possible, with the engine 220 providing rotational power to any of the sun gear 242, the planet carrier 244, and the ring gear 248, the CVP 234 providing rotational power, respectively, to any other of the sun gear 242, the planet carrier 244, and the ring gear 248, and the remaining one of the sun gear 242, the planet carrier 244, and the ring gear 248.

To control transition between various transmission modes, a control assembly 256 may be configured to receive power one or more of directly from the engine 220, from the engine 220 and the CVP 234 via the variator 240, and directly from the CVP 234, and to transmit the received power to various downstream components. In the power train 12c, for example, the control assembly 256 may include a single shaft (or set of coaxial shafts) 258 and shaft 260, which may each be in communication with various power sinks or other downstream components (not shown) of the vehicle 10, such as various vehicle wheels, one or more differentials, a power-shift or other transmission, and so on. The shaft(s) 258 may be in communication with (e.g., may be engaged with) clutch devices 262 and 266, which may be variously configured as wet clutches, dry clutches, dog collar clutches, or other similar devices mounted to the shaft(s) 258. Similarly, the shaft 260 may be in communication with (e.g., may be engaged with) a clutch device 264, which may also be configured as a wet clutch, dry clutch dog collar clutch, or other similar device mounted to the shaft 260. It will be understood that other configurations may be possible, including configurations with different combinations of the clutch devices 262, 264 and 266 engaged with the shafts 258 and 260, or with additional shaft(s) (not shown) for engaging one or more of the clutch devices 262, 264, and 266.

The clutch device 262 may be in communication with a gear 268, which may be meshed (directly or indirectly) with the gear 224 on the engine output shaft 222. Accordingly, when the clutch device 262 is engaged, a power-transmission path may be provided from the engine 220 to the shaft(s) 258, via the gears 224 and 268 and the clutch device 262. (As depicted, the gear 224 may transmit power from the shaft 222 to both the CVP 230 and the gear 268. It will be understood, however, that separate gears (not shown) may separately transmit power, respectively, from the engine 220 to the gears 226 and 268.)

Similarly, the clutch device 264 may be in communication with a gear 270, which may be meshed (directly or indirectly) with the ring gear 248 (or another output component) of the variator 240. Accordingly, when the clutch device 264 is engaged, a power-transmission path may be provided from the variator 240 to the shaft(s) 258, via the gear 270 and the clutch device 264. Finally, the clutch device 266 may be in communication with a gear 270, which may be meshed (directly or indirectly) with the gear 138 on the output shaft 236 of the CVP 234. Accordingly, when the clutch device 266 is engaged, a power-transmission path may be provided from the CVP 234 to the shaft(s) 258, via the gears 138 and 272 and the clutch device 266.

In this way, for example, engaging the clutch device 262 and disengaging the clutches 264 and 266 may place the power train 12c in a mechanical-path mode, in which rotational power is directly transmitted from the engine 220, via the clutch device 262, to the shaft(s) 258. Further, engaging the clutch device 264 and disengaging the clutches 262 and 266 may place the power train 12c in a split-path mode, in which power from both the engine 220 and the CVP 234 is combined in the variator 240 before being transmitted, via the clutch device 264, to the shaft(s) 258. Finally, engaging the clutch device 266 and disengaging the clutches 262 and 264 may place the power train 12c in a CVP-only mode, in which rotational power is directly transmitted from the CVP 234, via the clutch device 266, to the shaft(s) 258.

Figure 5:
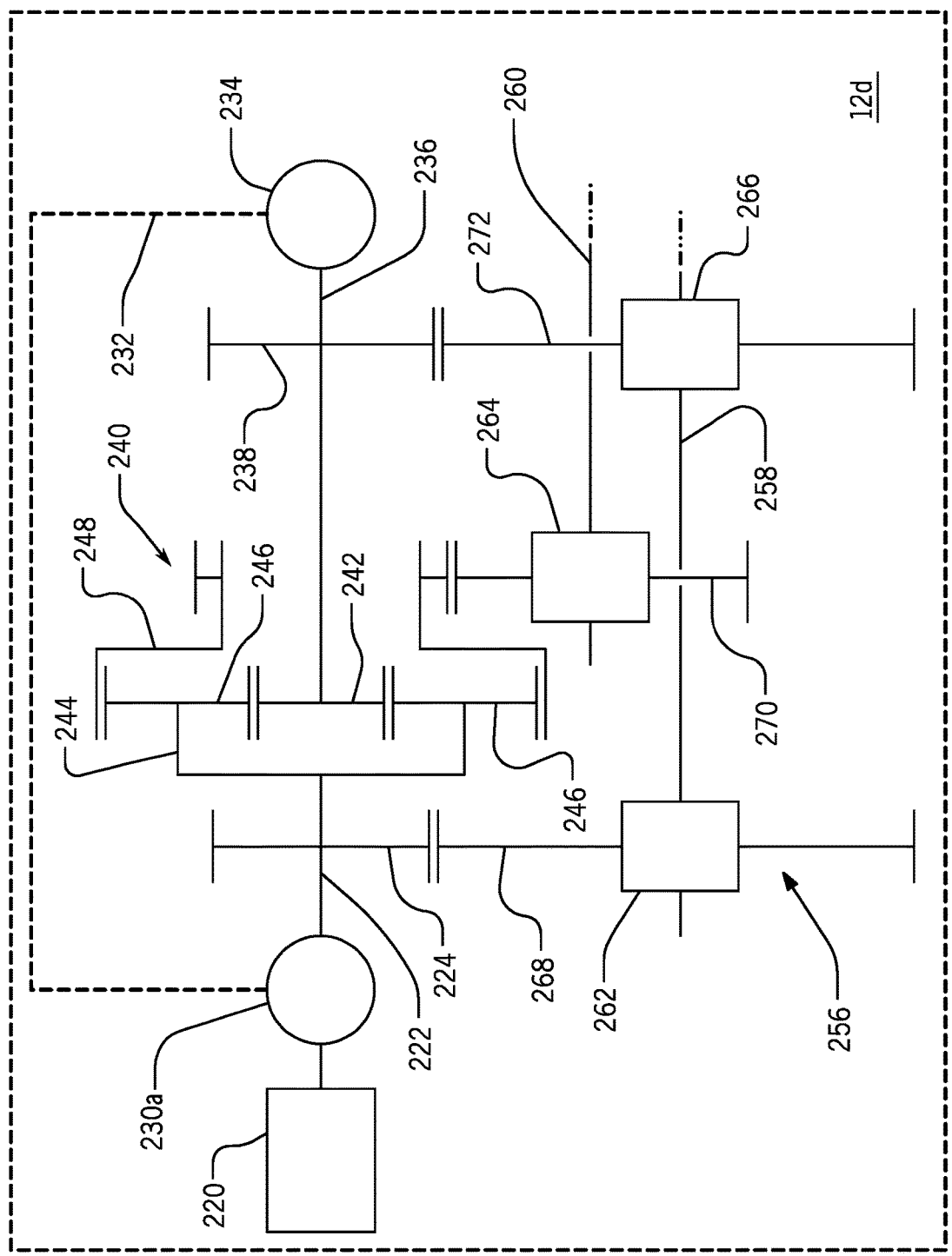
FIG. 5 is a schematic view of still another example power train of the example vehicle of FIG. 1.

Various other configurations may also be possible. For example, in certain embodiments (including embodiments similar to the examples presented above), a first CVP may be provided in series with an engine and a variator. Referring also to FIG. 5, for example, a power train 12d may be generally similar to the power train 12c of FIG. 4. In the power train 12d, however, a CVP 230a may be provided between the engine 220 and the variator 240, such that the engine 220 provides power to the CVP 230a and the variator 240 in series.

As noted above, in certain embodiments, multiple parallel (or other) shafts, including parallel and non-coaxial shafts, may be utilized for various functionality of the disclosed power train. As depicted in FIG. 4, for example, the various clutch devices 262, 264 and 266 of the control assembly 256 may be arranged on multiple parallel and non-coaxial shafts 258 and 260. Rotational power transmitted, respectively, to the shafts 258 and 260 may be utilized for distinct functionality, or may be recombined in various known ways (e.g., through another summing planetary gear set). Other configurations may also be possible, including configurations with a different number or arrangement of the various shafts.

Figure 6:
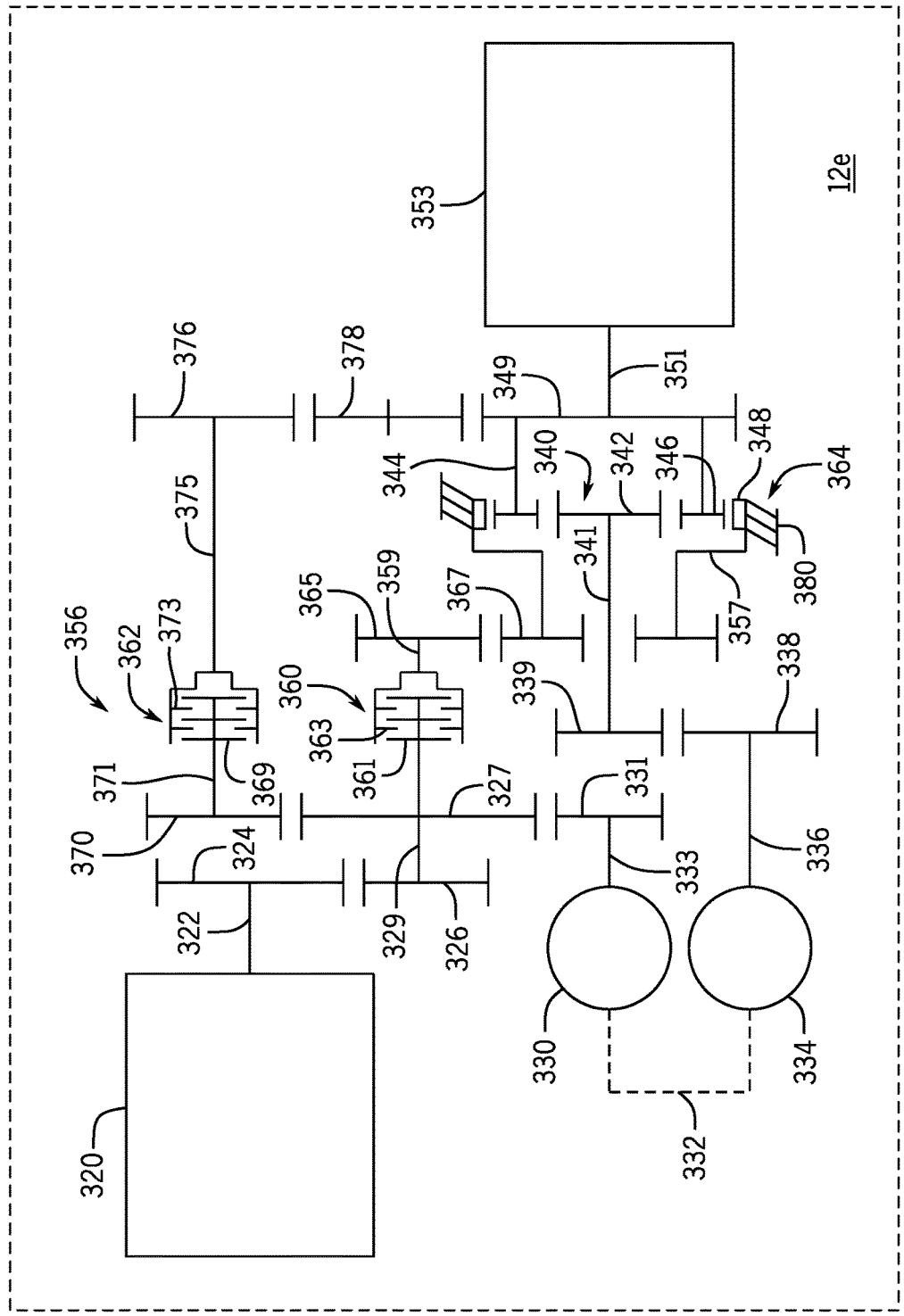
FIG. 6 is a schematic view of another example power train of the example vehicle of FIG. 1.

Referring now to FIG. 6, another example power train 12e is depicted. The power train 12e may include an engine 320, which may be an internal combustion engine of various known configurations. The power train 12e may also include a CVP 330 (e.g., an electrical generator or hydraulic pump) and a CVP 334 (e.g., an electrical or hydraulic motor, respectively), which may be connected by a conduit 332 (e.g., an electrical or hydraulic conduit, respectively).

The engine 320 may provide rotational power to an output shaft 322, for transmission to one or more power sinks (e.g., wheels, PTO shafts, and so on) of the vehicle 10. In certain embodiments, a torque converter or other device may be included between the engine 320 and the shaft 322 (or another shaft (not shown)), although such a device is not necessary for the operation of the power train 12e, as contemplated by this disclosure. Further, in certain embodiments, multiple shafts (not shown), including various shafts interconnected by various gears or other power transmission devices, or equivalent power transmission devices (e.g., chains, belts, and so on) may be used in place of the shaft 322 (or various other shafts discussed herein).

The shaft 322 may be configured to provide rotational power to a gear 324, or another power transmission component (not shown), for transmission of power from the engine 320 to a gear 326. In turn, the gear 326 may provide rotational power to a gear 327 that is mounted to a common shaft 329. The gear 327 may be enmeshed with a gear 370, which is mounted on a parallel shaft 371. The gear 327 may also be enmeshed with a gear 331 on another parallel shaft 333. The shaft 333 may provide rotational power to the CVP 330. The CVP 330 converts the power to an alternate form (e.g., electrical or hydraulic power) for transmission over the conduit 332. This converted and transmitted power may then be re-converted by the CVP 334 for mechanical output along an output shaft 336. Various known control devices (not shown) may be provided to regulate such conversion, transmission, re-conversion and so on.

In certain embodiments, the shaft 336 may be in communication with a gear 338 (or other similar component). The gear 338 may transfer power to a gear 339 that is mounted on a shaft 341, which may be parallel to shaft 336. The shaft 341 may provide rotational power to a variator 340. The engine 320 may also provide rotational power to the variator 340 along another path, which will be discussed in detail below.

Generally, the variator 340 may include a variety of devices capable of summing the mechanical inputs from the CVP 334 and the engine 320 for a combined mechanical output, as may be useful, for example, for split-path power transmission. In certain embodiments, as depicted in FIG. 6, the variator 340 may be configured as a summing planetary gear set (e.g., a single planetary gear set).

As depicted, the shaft 341 may provide power to a sun gear 342 of the variator 340. The variator 340 may also include a ring gear 348. The engine 320 may selectively provide power to the ring gear 348 as will be discussed. The variator 340 may further include a plurality of planet gears 346 and an associated carrier 344. The planet gears 346 may sum power from the sun gear 342 and the ring gear 348, and the carrier 344 may transfer the summed power to an attached gear 349. The gear 349 may be mounted on and may transfer power to an output shaft 351. The output shaft 351 may transfer power to an output component 353, such as a range box, a wheel axle, a power take-off (PTO) shaft, or other component.

Accordingly, the variator 340 may receive power from the CVP 334 (i.e., CVP power) and power from the engine 320 (i.e., engine power). The variator 340 may transmit a combination (i.e., a sum) of this power to the output component 353. This may be a useful configuration because the CVP 334 may operate more efficiently at higher rotational speeds than the engine 320, which may be complimented by a speed reduction from the sun gear 342 to the planet carrier 347. It will be understood, however, that other configurations may be possible, with the engine 320 providing rotational power to any of the sun gear 342, the planet carrier 347, and the ring gear 348; the CVP 334 providing rotational power, respectively, to any other of the sun gear 342, the planet carrier 344, and the ring gear 348; and the remaining one of the sun gear 342, the planet carrier 344, and the ring gear 348 outputting power to the output component 353.

To control transition between various transmission modes, a control assembly 356 may be configured to receive power from one or more of: 1) directly from the engine 320; 2) from both the engine 320 and the CVP 334 via the variator 340; and 3) directly from the CVP 334. The control assembly 356 may also be configured to transmit this received power to the output component 353. In the power train 12e, for example, the control assembly 356 may include one or more selectable transmission components. The selectable transmission components may each have a first position (e.g., an engaged position), in which the component transmits power from an input component to an output component. The selectable transmission components may also have a respective second position (e.g., a disengaged position), in which the device prevents power transmission from the input to the output component. The selectable transmission component may include one or more wet clutches, dry clutches, dog collar clutches, brakes, synchronizers, or other similar devices. The device may also include an actuator (e.g., a hydraulic actuator, an electric motor, etc.) for actuating the selectable transmission component between the first and second positions. Furthermore, the control assembly 356 may include a controller (e.g., a computerized controller or hydraulic controller) configured for controlling the actuator and, ultimately, controlling movement of the selectable transmission component.

As shown in FIG. 6, the control assembly 356 may include a first clutch 360, a second clutch 362, and a brake 364. Each of these selectable transmission components will be discussed in detail below. As will be discussed, the control assembly 356 may include various features that provide effective and selective power transfer. Also, the control assembly 356 may include features that make the power train 12e more compact, that reduce the overall part count, that increase manufacturability, and the like.

The first clutch 360 may include one or more first components 361 (e.g., clutch/friction plates, etc.) that are mounted on the shaft 329. The first clutch 360 may also include one or more corresponding second components 363 that are attached to a shaft 359. A gear 365 is mounted on the shaft 359. Accordingly, when the first clutch 360 is in the first (engaged) position, power may transfer from the shaft 329 to the gear 365. Conversely, the first clutch 360 may prevent such power transfer when in the second (disengaged) position.

In some embodiments, the first clutch 360 may be configured for selectively transferring power from the engine 320 to the variator 340. More specifically, as noted above, the shaft 329 may receive power from the engine 320 (via the shaft 322, the gear 324, and the gear 326). The gear 365 may be enmeshed with a gear 367 that is mounted for rotation on the shaft 341. The gear 367 may be connected (via a transmission component 357 to the ring gear 348 of the variator 340.

The second clutch 362 may include one or more first components 369 (e.g., friction/clutch plates, etc.) that are mounted on a shaft 371. The second clutch 362 may also include one or more corresponding second components 373 that are mounted on a shaft 375. Accordingly, when the second clutch 362 is in the first (engaged) position, power may transfer from the shaft 371 to the shaft 375. Conversely, the second clutch 362 may prevent such power transfer when in the second (disengaged) position.

In some embodiments, the second clutch 362 may be configured for selectively transferring power from the engine 320 to the output component 353. This power transmission path bypasses the variator 340. More specifically, as noted above, the shaft 371 may receive power from the engine 320 (via the shaft 322, the gear 324, the gear 326, the shaft 329, the gear 327, and the gear 370). Also, the shaft 375 may include a gear 376 fixed thereon. The gear 376 may be enmeshed with an idler gear 378, which is enmeshed with the gear 349. As mentioned above, the gear 349 may be mounted on the output shaft 351 of the output component 353.

The brake 364 may be mounted to a chassis 380 of the vehicle 10. The brake 364 may be operably coupled to the ring gear 348 of the variator 340. Accordingly, the brake 364 may have a first (braked) position, in which the brake 364 fixes the ring gear 348 to the chassis of the vehicle 10. The brake 364 may also have a second (unbraked) position, in which the brake 364 allows movement of the ring gear 348 relative to the chassis.

In some embodiments, engaging the second clutch 362 and disengaging the first clutch 360 and the brake 364 may place the power train 12e in a mechanical-path mode (i.e., a direct-drive mode), in which rotational power is directly transmitted from the engine 320 to the output component 353. Specifically, power from the engine 320 transfers from the shaft 322, to the gear 324, to the gear 326, to the shaft 329, to the gear 327, to the gear 370, through the second clutch 362 to the gear 376, to the gear 378, to the gear 349, to the shaft 351, and ultimately to the output component 353. It is noted that this transmission path from the engine 320 to the output component 353 bypasses the variator 340. Also, rotational power from the CVP 334 is prevented from transmitting to the output component 353 in this mode.

Furthermore, engaging the first clutch 360 and disengaging the second clutch 362 and the brake 364 may place the power train 12e in a split-path mode, in which power from both the engine 320 and the CVP 334 is combined in the variator 240 before being transmitted to the output component 353. Specifically, power from the engine 320 transfers from the shaft 322, to the gear 324, to the gear 326, to the shaft 329, through the first clutch 360, to the gear 365, to the gear 367, and to the ring gear 348 of the variator 340. Meanwhile, power from the CVP 334 transfers from the shaft 336 to the gear 338, to the gear 339, to the shaft 341, to the sun gear 342 of the variator 340. The planet gears 346 and associated carrier 344 may sum the power from the engine 320 and the CVP 334 and output the summed power to the gear 349, to the shaft 351, and ultimately to the output component 353.

Moreover, engaging the brake 364 and disengaging the first and second clutches 360, 362 may place the power train 12e in a CVP-only mode (i.e., a series mode). In this mode, rotational power may be transferred from the engine 320 to the CVP 330 for powering the CVP 334, and the CVP 334 may output rotational power to the output component 353. Specifically, power from the engine 320 transfers from the shaft 322 to the gear 324, to the gear 326, to the shaft 329, to the gear 327, to the gear 331, to the shaft 333, for powering the CVP 330. The CVP 330 may convert this mechanical power to another form and supply power (via the conduit 332) to the CVP 334. The CVP 334 may output mechanical power to the shaft 336, to the gear 338, to the gear 339, to the shaft 341, to the sun gear 342, to the planet gears 346 and carrier 344, to the gear 349, to the shaft 351, and ultimately to the output component 353. It is noted that rotational power from the engine 320 is prevented from transmitting to the output component 353 in this mode.

In some embodiments, the vehicle 10 may be propelled in a forward direction with the power train 12e in any of the direct drive, split path, and series modes. Also, in some embodiments, the vehicle 10 may be propelled in an opposite reverse direction with the power train 12e in the series mode instead of the direct drive and split path modes.

The power train 12e may shift between the direct drive, split path, and series modes to maintain high efficiency operation. It will be appreciated that the power train 12e may be relatively compact and with a relatively low part count. In particular, the brake 364 provides simplicity to the layout of the power train 12e. Also, the brake 364 reduces the number of components of the power train 12e compared to other selectively engageable transmission components.

Figure 7:
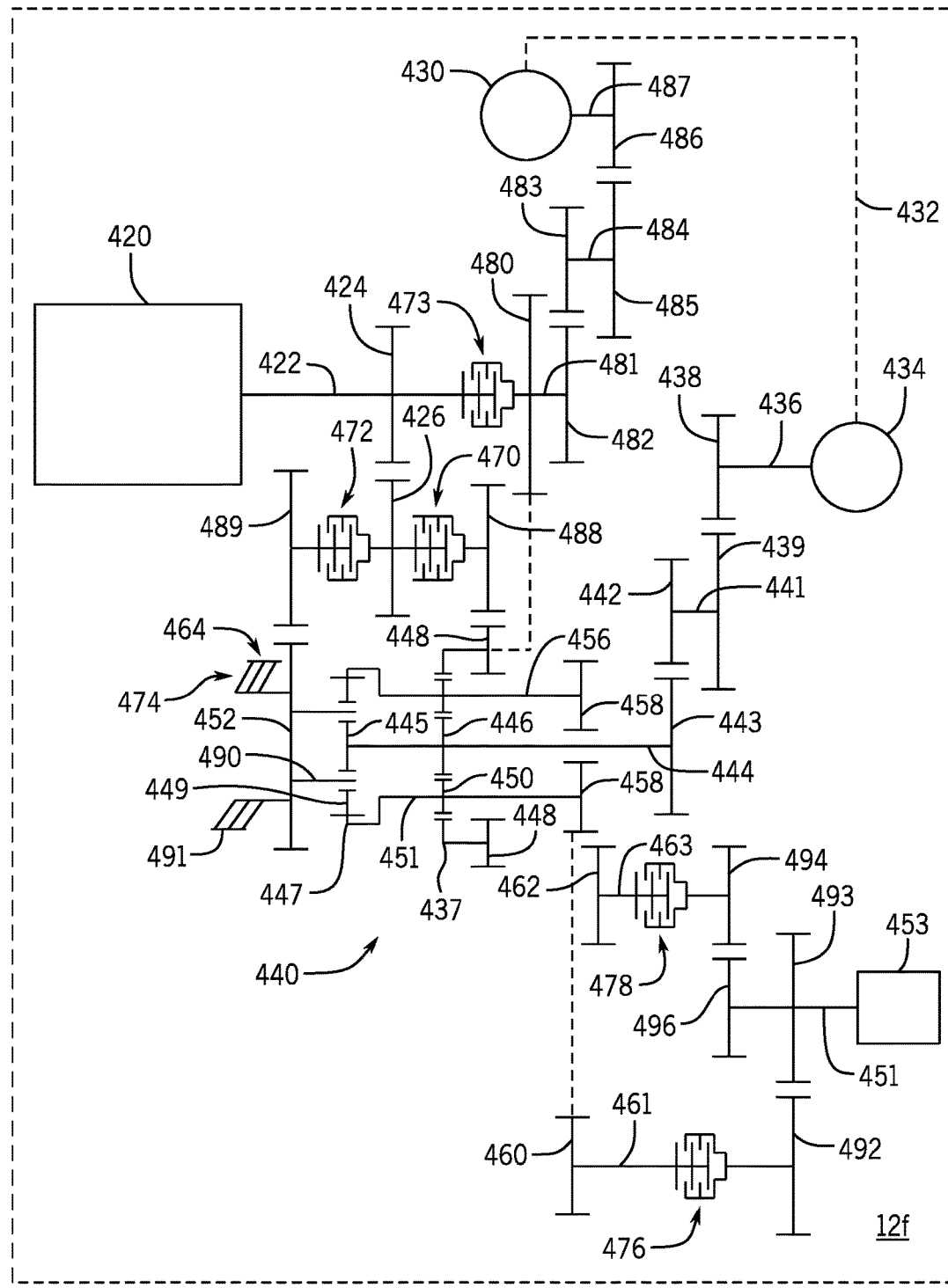
FIG. 7 is a schematic view of a further example power train of the example vehicle of FIG. 1.

Referring now to FIG. 7, another example power train 12f is depicted. The power train 12f may include an engine 420, which may be an internal combustion engine of various known configurations. The power train 12f may also include a CVP 430 (e.g., an electrical generator or hydraulic pump) and a CVP 434 (e.g., an electrical or hydraulic motor, respectively), which may be connected by a conduit 432 (e.g., an electrical or hydraulic conduit, respectively).

The engine 420 may provide rotational power to an output shaft 422, for transmission to one or more power sinks (e.g., wheels, PTO shafts, and so on) of the vehicle 10. In certain embodiments, a torque converter or other device may be included between the engine 420 and the shaft 422 (or another shaft (not shown)), although such a device is not necessary for the operation of the power train 12f, as contemplated by this disclosure. Further, in certain embodiments, multiple shafts (not shown), including various shafts interconnected by various gears or other power transmission devices, or equivalent power transmission devices (e.g., chains, belts, and so on) may be used in place of the shaft 422 (or various other shafts discussed herein).

The shaft 422 may be configured to provide rotational power to a gear 424, or another power transmission component (not shown), for transmission of power from the engine 420 to a gear 426. Power from the engine 420 may be transmitted via the gear 424 and/or the gear 426 to other components of the power train 12f as will be discussed in detail below.

The CVP 430 converts power (e.g., power from the engine 420) to an alternate form (e.g., electrical or hydraulic power) for transmission over the conduit 432. This converted and transmitted power may then be re-converted by the CVP 434 for mechanical output along an output shaft 436. Various known control devices (not shown) may be provided to regulate such conversion, transmission, re-conversion, and so on.

In certain embodiments, the output shaft 436 may be in communication with a gear 438 (or other similar component). The gear 438 may transfer power to a gear 439 that is mounted on a shaft 441. The shaft 441 may be parallel to the shaft 436. A gear 442 may be also be fixedly mounted on the shaft 441. The gear 442 may be enmeshed with a gear 443, which is fixedly mounted on a shaft 444. The shaft 444 may be parallel to the shaft 441. The shaft 444 may provide rotational power (originally provided from the CVP 434) to a variator 440. The engine 420 may also provide rotational power to the variator 440 along another path, which will be discussed in detail below.

Generally, the variator 440 may include a variety of devices capable of summing the mechanical inputs from the CVP 434 and the engine 420 for a combined mechanical output, as may be useful, for example, for split-path power transmission. In certain embodiments, as depicted in FIG. 7, the variator 440 may be configured as a summing planetary gear set. In some embodiments, the variator 440 may comprise a double planetary gear set.

As depicted, the shaft 444 may selectively provide power to a first sun gear 445 and a second sun gear 446 of the variator 440. The variator 440 may also include a first ring gear 447 and a second ring gear 437. Additionally, the variator 440 may include first planet gears 449 and second planet gears 450. The first planet gears 449 may be disposed between and enmeshed with the first ring gear 447 and the first sun gear 445. The second planet gears 450 may be disposed between and enmeshed with the second ring gear 437 and the second sun gear 446. Furthermore, the first planet gears 449 may be interconnected with a first carrier 490. The second planet gears 450 may be interconnected with a second carrier 454. The first ring gear 447 may be connected to the second planet gears 450 via the second carrier 454. The second ring gear 437 may also be connected to a gear 448. The variator 440 may also include a third carrier 456, which is attached to the second planet gears 450. The third carrier 456 may be connected to a gear 458. The gear 458 may be enmeshed with a gear 460, which is fixedly mounted to a shaft 461. The gear 458 may also be enmeshed with a gear 462, which is fixedly mounted to a shaft 463.

The power train 12f may be operated in a plurality of different transmission modes. To control transition between the various modes, a control assembly 464 may be configured to receive power from one or more of: 1) directly from the engine 420; 2) from both the engine 420 and the CVP 434 via the variator 440; and 3) directly from the CVP 434. The control assembly 464 may also be configured to transmit this received power to a shaft 451 of an output component 453, such as a range box, a wheel axle, a power take-off (PTO) shaft, or other component of the vehicle 10.

In the power train 12f, for example, the control assembly 464 may include one or more selectable transmission components. The selectable transmission components may have a first position (an engaged position), in which the device transmits power from an input component to an output component. The selectable transmission components may also have a second position (a disengaged position), in which the device prevents power transmission from the input to the output component. The selectable transmission components of the control assembly 464 may include one or more wet clutches, dry clutches, dog collar clutches, brakes, synchronizers, or other similar devices. The device may also include an actuator for actuating the selectable transmission components between the first and second position. Furthermore, the control assembly 464 may include a controller (e.g., a computerized controller or hydraulic controller)

configured for controlling the actuator and, ultimately, controlling movement of the selective transmission device.

As shown in FIG. 7, the control assembly 464 may include a first forward clutch 470, a second forward clutch 472, a reverse clutch 473, a brake 474, a first output clutch 476, and a second output clutch 478. As will be discussed, the control assembly 464 may include various features that provide effective and selective power transfer. Also, the control assembly 464 may include features that make the power train 12f more compact, that reduce the overall part count, that increase manufacturability, and the like.

The first forward clutch 470, in an engaged position, may engage the gear 426 and a gear 488 such that the gears 426, 488 rotate in unison. The first forward clutch 470, in a disengaged position, may allow the gear 426 to rotate relative to the gear 488. The gear 488 may be enmeshed with the gear 448.

The second forward clutch 472 may engage and, alternatively, disengage the gear 426 and a gear 489. The gear 489 may be enmeshed with a gear 452. The gear 452 may be connected to the first carrier 490 of the variator 440.

The reverse clutch 473 may engage and, alternatively, disengage the shaft 422 and a shaft 481, which supports a gear 480. The gear 480 may be enmeshed with the gear 448. The shaft 481 may also support a gear 482. The gear 482 may, in turn, be enmeshed with a gear 483. The gear 483 may be fixedly mounted on a common shaft 484 with a gear 485. The gear 485 may be enmeshed with a gear 486, which is fixedly mounted to an output shaft 487 of the CVP 430.

The brake 474 may be mounted to a chassis 491 of the vehicle 10. The brake 474 may be operably coupled to the gear 452 (and, thus, to the first planet gears 449 via the first carrier 490). Accordingly, the brake 474 may have a first (braked) position, in which the brake 474 fixes the first planet gears 449 to the chassis 491. The brake 474 may also have a second (unbraked) position, in which the brake 474 allows movement of the first planet gears 449 relative to the chassis 491.

The first output clutch 476 may engage and, alternatively, disengage the gear 460 and a gear 492. The gear 492 may be enmeshed with a gear 493, which is fixedly mounted on the shaft 451 for transmitting power to the output component 453.

The second output clutch 478 may engage and, alternatively, disengage the gear 462 and a gear 494. The gear 494 may be enmeshed with a gear 496, which is fixedly mounted on the shaft 451 for transmitting power to the output component 453.

The different transmission modes of the power train 12f will now be discussed. Like the embodiments discussed above, the power train 12f may have at least one mechanical-path mode (i.e., direct-drive mode), at least one split-path mode, and at least one CVP-only mode (i.e., series mode).

In some embodiments, engaging the first forward clutch 470, the second forward clutch 472, and the first output clutch 476, and disengaging the brake 474, the second output clutch 478, and the reverse clutch 473 may place the power train 12f in a first mechanical-path mode (i.e., a low range direct-drive mode). In this mode, rotational power is directly transmitted from the engine 420 to the output component 453. Also, in some embodiments, rotational power from the CVP 434 is prevented from transmitting to the output component 453. Specifically, power from the engine 420 transfers from the shaft 422, to the gear 424, to the gear 426, and branches through the first and second forward clutches 470, 472. Power through the first forward clutch 470 transfers to the gear 488, to the gear 448, and to the second ring gear 437. Meanwhile, power through the second forward clutch 472 transfers to the gear 489, to the gear 452, to the carrier 490, to the first ring gear 447. Engine power re-combines at the second planet gears 450 and transfers to the gear 458, to the gear 460, through the first output clutch 476, to the gear 492, to the gear 493, and ultimately to the output component 453.

In some embodiments, engaging the first forward clutch 470, the second forward clutch 472, and the second output clutch 478, and disengaging the brake 474, the first output clutch 476, and the reverse clutch 473 may place the power train 12f in a second mechanical-path mode (i.e., a high range direct-drive mode). Power transmission may be substantially similar to the first direct-drive mode described above, except that power at the second planet gears 450 may transfer to the gear 458, to the gear 462, through the second output clutch 478, to the gear 494, to the gear 496, to the gear 493, and ultimately to the output component 453. In some embodiments, this mode may provide a higher output speed range for the vehicle 10 as compared to the speed range provided by the first direct-drive mode.

Furthermore, engaging the first forward clutch 470 and the first output clutch 476 and disengaging the second forward clutch 472, the reverse clutch 473, the second output clutch 478, and the brake 474 may place the power train 12f in a first split-path mode, in which power from both the engine 420 and the CVP 434 is combined in the variator 440 before being transmitted to the output component 453. Specifically, power from the engine 420 transfers from the shaft 422, to the gear 424, to the gear 426, to the gear 488, to the gear 448, to the second ring gear 437 of the variator 440. Power at the gear 448 may also transmit to the gear 480, to the gear 482, to the gear 483, to the gear 485, to the gear 486 for powering the CVP 430. The CVP 430 may convert this mechanical input to electrical power for powering the CVP 434. Mechanical power from the CVP 434 may transfer from the shaft 436 to the gear 438, to the gear 439, to the gear 442, to the gear 443, to the shaft 444, and to the second sun gear 446 of the variator 440. The second planet gears 450 may sum the power from the engine 420 and the CVP 434, and the carrier 456 may output the summed power to the gear 458, to the gear 460, through the first output clutch 476, to the gear 492, to the gear 493, to the shaft 451, and ultimately to the output component 453.

Engaging the first forward clutch 470 and the second output clutch 478 and disengaging the second forward clutch 472, the reverse clutch 473, the first output clutch 476, and the brake 474 may place the power train 12f in a second split-path mode, in which power from both the engine 420 and the CVP 434 is combined in the variator 440 before being transmitted to the output component 453. Power transmission may be substantially similar to the first split-path mode described above, except that summed power at the gear 458 may transfer to the gear 462, through the second output clutch 478, to the gear 494, to the gear 496, to the gear 493, and ultimately to the output component 453. In some embodiments, this mode may provide a higher output speed range for the vehicle 10 as compared to the speed range provided by the first split-path mode.

Also, in some embodiments, engaging the second forward clutch 472 and the first output clutch 476 and disengaging the first forward clutch 470, the reverse clutch 473, the second output clutch 478, and the brake 474 may place the power train 12f in a third split-path mode, in which power from both the engine 420 and the CVP 434 is combined in the variator 440 before being transmitted to the output component 453. Specifically, power from the engine 420 transfers from the shaft 422, to the gear 424, to the gear 426, to the gear 489, to the gear 452, to the first planet gears 449 of the variator 440. Meanwhile, power from the CVP 434 may transfer from the shaft 436 to the gear 438, to the gear 439, to the gear 442, to the gear 443, to the shaft 444, and to the first sun gear 445 of the variator 440. The first ring gear 447 may sum the power from the engine 420 and the CVP 434, and the carrier 454 may output the summed power to the second planet gears 450 and the carrier 456, to the gear 458, to the gear 460, through the first output clutch 476, to the gear 492, to the gear 493 to the shaft 451, and ultimately to the output component 453. In some embodiments, this mode may provide a higher output speed range for the vehicle 10 as compared to the speed range provided by the first and second split-path modes discussed above.

Engaging the second forward clutch 472 and the second output clutch 478 and disengaging the first forward clutch 470, the reverse clutch 473, the first output clutch 476, and the brake 474 may place the power train 12*f* in a fourth split-path mode, in which power from both the engine 420 and the CVP 434 is combined in the variator 440 before being transmitted to the output component 453. Power transmission may be substantially similar to the third split-path mode described above, except that summed power at the gear 458 may transfer to the gear 462, through the second output clutch 478, to the gear 494, to the gear 496, to the gear 493, and ultimately to the output component 453. In some embodiments, this mode may provide a higher output speed range for the vehicle 10 as compared to the speed range provided by the first, second, and third split-path modes.

Moreover, engaging the brake 474 and the first output clutch 476 and disengaging the first forward clutch 470, the second forward clutch 472, the reverse clutch 473, and the second output clutch 478 may place the power train 12*f* in a first CVP-only mode (i.e., a first series mode). In this mode, the engine 420 may be disconnected from the variator 440 and the CVP 430. The CVP 434 may output rotational power to the output component 453. Specifically, the CVP 434 may output mechanical power to the shaft 436, to the gear 438, to the gear 439, to the shaft 441, to gear 442, to the gear 443, to the second sun gear 446, to the planet gears 450 and carrier 456, to the gear 458, to the gear 460, through the first output clutch 476, to the gear 492, to the gear 493, to the shaft 451, and ultimately to the output component 453.

In some embodiments, engaging the brake 474 and the second output clutch 478 and disengaging the first forward clutch 470, the second forward clutch 472, the reverse clutch 473, and the first output clutch 476 may place the power train 12*f* in a second CVP-only mode (i.e., a second series mode). Power transmission may be substantially similar to the first series mode described above, except that power at the gear 458 may transfer to the gear 462, through the second output clutch 478, to the gear 494, to the gear 496, to the gear 493, and ultimately to the output component 453. In some embodiments, this mode may provide a higher output speed range for the vehicle 10 as compared to the speed range provided by the first series mode.

Additionally, in some embodiments, engaging the reverse clutch 473 and the first output clutch 476 and disengaging the brake 474, the second output clutch 478, the first forward clutch 470, and the second forward clutch 472 may place the power train 12*f* in a first reverse split-path mode. Power from both the engine 420 and the CVP 434 is combined in the variator 440 before being transmitted to the output component 453, and the vehicle 10 is propelled in the reverse direction. Specifically, power from the engine 420 transfers from the shaft 422, through the reverse clutch 473, to the gear 480, to the gear 448, to the second ring gear 437 of the variator 440. Power at the gear 480 may also transmit to the gear 482, to the gear 483, to the gear 485, to the gear 486 for powering the CVP 430. The CVP 430 may convert this mechanical input to electrical power for powering the CVP 434. Mechanical power from the CVP 434 may transfer from the shaft 436 to the gear 438, to the gear 439, to the gear 442, to the gear 443, to the shaft 444, and to the second sun gear 446 of the variator 440. The second planet gears 450 may sum the power from the engine 420 and the CVP 434, and the carrier 456 may output the summed power to the gear 458, to the gear 460, through the first output clutch 476, to the gear 492, to the gear 493, to the shaft 451, and ultimately to the output component 453.

Furthermore, in some embodiments, engaging the reverse clutch 473 and the second output clutch 478 and disengaging the brake 474, the first output clutch 476, the first forward clutch 470, and the second forward clutch 472 may place the power train 12*f* in a second reverse split-path mode. Power transmission may be substantially similar to the first reverse split-path mode described above, except that power at the gear 458 may transfer to the gear 462, through the second output clutch 478, to the gear 494, to the gear 496, to the gear 493, and ultimately to the output component 453. In some embodiments, this mode may provide a higher output speed range for the vehicle 10 as compared to the speed range provided by the first reverse split-path mode.

The power train 12*f* may shift between the direct drive, split path, and series modes to maintain high efficiency operation. It will be appreciated that the power train 12*f* may be relatively compact and with a relatively low part count. In particular, the brake 474 provides simplicity to the layout of the power train 12*f*. Also, the brake 474 reduces the number of components compared to other selectively engageable transmission components.

The clutches, brakes, and/or other selectable transmission components of the control assemblies 56, 156, 256, 356, 464 (or other control assemblies) may be controlled by actuators of known configuration (not shown). These actuators, in turn, may be controlled by a transmission control unit ("TCU") (not shown), which may receive various inputs from various sensors or devices (not shown) via a CAN bus (not shown) of the vehicle 10. In certain embodiments, the various control assemblies may, for example, be controlled in accordance with programmed or hard-wired shift control logic contained in or executed by a TCU.

Similarly, the various CVPs contemplated by this disclosure (e.g., CVPs 30, 32, 130, 132, 230, 232, 230*a*, 330, 334, 430, 434) may be controlled by various known means. For example, a TCU or other controller may control the output speed (or other characteristics) of a CVP based upon various inputs from various sensors or other controllers, various programmed or hard-wired control strategies, and so on. Transmission of converted power between CVPs (e.g., between the CVPs 30 and 32) and various intermediary devices, such as batteries or other energy storage devices (not shown) may also be similarly controlled.

In certain embodiments, additional gear sets (e.g., a set of range gears) may be interposed between the depicted components of the power trains 12 and various power sinks of the vehicle 10 (e.g., a differential or PTO shaft (not shown)). For example, a transmission of various configurations (e.g., multi-speed range transmission such as a wet-clutch range box with power shifting ability, or a power-shift range box with various synchronizers) may be provided downstream of the various clutch devices 62, 64, 162, 164, 166, 262, 264,

266, 360, 362, 470, 472, 473, 476, 478, the various brakes 364, 474, and/or other selectable transmission components, for further adjustment of speed and torque to power various vehicle power sinks.

In certain embodiments, the disclosed variators (e.g., the variators 40, 140, 240, 340, 440) may generally provide infinitely variable control within a particular gear range (e.g., of a downstream power-shift transmission). Accordingly, the disclosed variators may be utilized to usefully address transient speed responses in a relevant vehicle or other platform (e.g., due to shifting between gears, changes in ground speed and so on), a traditional engine may be utilized to usefully address any transient torque requirements (e.g., due to changes in vehicle load), and the relevant control assembly may switch between transmission modes as appropriate.

In certain embodiments, the disclosed system may allow for relatively simple customization of various vehicle (or other) platforms. For example, a standard engine, a standard variator and standard control assembly components may be provided for a variety of vehicle platforms, with the needs of any particular platform being addressed through the inclusion of a particular transmission downstream of the control assembly (and through other customizations, as appropriate).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A work vehicle comprising:
   an engine;
   a first continuously variable power source (CVP) and a second CVP in series with the first CVP;
   a variator;
   an output component; and
   a control assembly including a plurality of transmission components configured to provide selection between a first mode, a second mode, and a third mode;
   the control assembly, in the first mode, configured to transfer engine power from the engine to the output component and prevent transmission of CVP power from either or both of the first CVP and the second CVP to the output component;
   the control assembly, in the second mode, configured to transfer engine power from the engine to the variator, transfer CVP power from either or both of the first CVP and the second CVP to the variator, and transfer a combination of engine power and CVP power from the variator to the output component;
   the control assembly, in the third mode, configured to transfer CVP power from either or both of the first CVP and the second CVP through the variator to the output component and prevent direct transmission of engine power from the engine to the output component; and
   the plurality of transmission components of the control assembly including a brake having a braked position and an unbraked position, the brake configured to change between the braked position and the unbraked position to provide one or more of the first mode, the second mode, and the third mode;
   wherein the control assembly, in the third mode, is configured to transfer mechanical engine power from the engine to the first CVP, which converts the mechanical engine power to electric power that powers the second CVP; and
   wherein the control assembly, in the third mode, is configured to transfer mechanical CVP power from the second CVP to the output component;
   wherein the brake is configured to change from the unbraked position to the braked position to provide the third mode; and
   wherein the brake is configured to be in the unbraked position to provide the first mode and the second mode.

2. The work vehicle of claim 1, further comprising a chassis;
   wherein the brake is operatively attached to a component of the variator;
   the brake, in the braked position, configured to fix the component relative to the chassis; and
   the brake, in the unbraked position, configured to allow rotation of the component relative to the chassis.

3. The work vehicle of claim 2, wherein the variator includes a planetary gear set with a sun gear, a plurality of planet gears, and a ring gear; and
   wherein the brake is operatively attached to the ring gear.

4. The work vehicle of claim 2, wherein the variator includes a double planetary gear set;
   wherein the double planetary gear set includes a first sun gear, a plurality of first planet gears and an associated first carrier, and a first ring gear;
   wherein the double planetary gear set includes a second sun gear, a plurality of second planet gears and an associated second carrier, and a second ring gear;
   wherein the second carrier connects the first ring gear and the plurality of second planet gears; and
   wherein the brake is operatively attached to the plurality of first planet gears and the associated first carrier.

5. The work vehicle of claim 1, wherein the control assembly, in the first mode, is configured to transfer engine power from the engine that bypasses the variator and that is transferred to the output component.

6. The work vehicle of claim 1, wherein the control assembly, in the third mode, is configured to transfer CVP power to the output component to drive the vehicle in a forward direction or a reverse direction.

7. A method of operating a power train of a work vehicle comprising:
   providing, in a first transmission mode, engine power from an engine to an output component of the vehicle while preventing transmission of CVP power from either or both of a first CVP and a second CVP in series with the first CVP to the output component;

providing, in a second transmission mode, engine power from the engine to a variator while providing CVP power from either or both of the first CVP and the second CVP to the variator and transferring a combination of engine power and CVP power from the variator to the output component;

providing, in a third transmission mode, CVP power from either or both of the first CVP and the second CVP through the variator to the output component while preventing direct transmission of engine power from the engine to the output component;

moving a brake from an unbraked position to a braked position to provide one or more of the first transmission mode, the second transmission mode, and the third transmission mode;

transferring, in the third mode, mechanical engine power from the engine to the first CVP for conversion of the mechanical engine power to electric power that powers the second CVP; and transferring, in the third mode, mechanical CVP power from the second CVP to the output component;

wherein moving the brake from the unbraked position to the braked position provides the third transmission mode; and further comprising positioning the brake in the unbraked position to provide the first transmission mode and the second transmission mode.

8. The method of claim 7, wherein the brake is operatively attached to a component of the variator;

wherein moving the brake from the unbraked position to the braked position includes fixing the component of the variator relative to a chassis of the work vehicle.

9. The method of claim 8, wherein the variator includes a planetary gear set with a sun gear, a plurality of planet gears, and a ring gear; and wherein moving the brake from the unbraked position to the braked position includes fixing the ring gear relative to the chassis.

10. The method of claim 8, wherein the variator includes a double planetary gear set;

wherein the double planetary gear set includes a first sun gear, a plurality of first planet gears and an associated first carrier, and a first ring gear;

wherein the double planetary gear set includes a second sun gear, a plurality of second planet gears and an associated second carrier, and a second ring gear;

wherein the second carrier connects the first ring gear and the plurality of second planet gears; and wherein moving the brake from the unbraked position to the braked position includes fixing the plurality of first planet gears and the associated first carrier relative to the chassis.

11. The method of claim 7, further comprising:

providing, in the first transmission mode, engine power from the engine that bypasses the variator to the output component of the vehicle.

12. The method of claim 7, further comprising:

transferring, in the third mode, CVP power to the output component to drive the work vehicle in a forward direction or a reverse direction.

13. A work vehicle comprising:

an engine;

a first variable power source (CVP);

a second CVP in series with the first CVP;

a variator comprising a planetary gear set with a sun gear, a plurality of planet gears with an associated carrier, and a ring gear;

an output component; and a control assembly including at least one clutch and at least one brake, the control assembly configured to provide selection between a first mode, a second mode, and a third mode;

the control assembly, in the first mode, configured to transfer engine power from the engine to the output component and prevent transmission of CVP power from the first and second CVP to the output component;

the control assembly, in the second mode, configured to transfer engine power from the engine to the variator, transfer CVP power from the first and second CVP to the variator, and transfer a combination of engine power and CVP power from the variator to the output component;

the control assembly, in the third mode, configured to transfer CVP power from the first and second CVP through the variator to the output component and prevent direct transmission of engine power from the engine to the output component; and the brake having a braked position and an unbraked position, the brake configured to change between the braked position and the unbraked position to provide at least one of the first mode, the second mode, and the third mode;

wherein the brake is configured to be in the unbraked position to provide the first mode and the second mode; and wherein the brake is configured to change from the unbraked position to the braked position to provide the third mode.

* * * * *